US008168923B2

(12) United States Patent
Wong et al.

(10) Patent No.: US 8,168,923 B2
(45) Date of Patent: May 1, 2012

(54) SYSTEM FOR HEATED FOOD DELIVERY AND SERVING

(76) Inventors: Chon Meng Wong, Lincoln, RI (US); Belinda Hong T. Wong, Lincoln, RI (US)

( * ) Notice: Subject to any disclaimer, the term of this patent is extended or adjusted under 35 U.S.C. 154(b) by 799 days.

(21) Appl. No.: 12/285,760

(22) Filed: Oct. 14, 2008

(65) Prior Publication Data

US 2010/0089902 A1 Apr. 15, 2010

(51) Int. Cl.

| | |
|---|---|
| ***H05B 1/02*** | (2006.01) |
| ***H05B 3/26*** | (2006.01) |
| ***A21B 1/52*** | (2006.01) |
| ***B65B 33/00*** | (2006.01) |
| ***A47J 36/24*** | (2006.01) |

(52) U.S. Cl. ........ 219/387; 279/479; 279/480; 279/543; 279/553

(58) Field of Classification Search ........................ None
See application file for complete search history.

(56) References Cited

U.S. PATENT DOCUMENTS

| | | | | |
|---|---|---|---|---|
| 4,816,646 | A | 3/1989 | Solomon | |
| 5,880,435 | A | 3/1999 | Bostic | |
| 5,884,006 | A | 3/1999 | Frohlich et al. | |
| 6,018,143 | A | 1/2000 | Check | |
| 6,060,696 | A | 5/2000 | Bostic | |
| 6,121,578 | A | 9/2000 | Owens et al. | |
| 6,222,987 | B1 | 4/2001 | Duke et al. | |
| 6,229,123 | B1 | 5/2001 | Kochman et al. | |
| 6,232,585 | B1 | 5/2001 | Clothier et al. | |
| 6,369,369 | B2 | 4/2002 | Kochman et al. | |
| 6,384,387 | B1 | 5/2002 | Owens et al. | |
| 6,392,201 | B1 | 5/2002 | Owens | |
| 6,403,935 | B2 | 6/2002 | Kochman et al. | |
| 6,433,313 | B1 | 8/2002 | Owens et al. | |
| 6,444,961 | B2 | 9/2002 | Clothier et al. | |
| 6,452,138 | B1 | 9/2002 | Kochman et al. | |
| 6,486,443 | B2 | 11/2002 | Bostic et al. | |
| 6,504,135 | B2 | 1/2003 | Clothier et al. | |
| 6,555,789 | B2 | 4/2003 | Owens et al. | |
| 6,847,018 | B2 * | 1/2005 | Wong | 219/549 |
| 6,861,628 | B2 | 3/2005 | Owens et al. | |
| 6,936,791 | B1 | 8/2005 | Baldwin et al. | |
| 6,989,517 | B2 | 1/2006 | Owens et al. | |

* cited by examiner

*Primary Examiner* — Joseph M Pelham
(74) *Attorney, Agent, or Firm* — Connolly Bove Lodge & Hutz LLP

(57) ABSTRACT

The invention involves a temperature regulated heated Pizza/Food delivery system that ca provide a continuous warming solution for pizza and food from the store, to the car and to the customer, in a vehicle, including the ability to be battery-powered, should an electrical outlet not be available. This invention can use a dual powered technology to power the heater directly from 110/220V AC wall outlets or 12V DC automotive outlets without needing power adapters. The heater's power plug can be a magnetic breakaway connector, accessible through an opening in the insulated bag. Two colored LED indicators can be used to indicate the source of power. A set of detachable feet that fit into the keyhole slot of the heater can allow it to stand independently. The Nonstick, water-resistant heater surface can allow it to serve heated food directly, replacing the ubiquitous fire hazard, Sterno.

10 Claims, 10 Drawing Sheets

SYSTEM FOR HEATED FOOD DELIVERY AND SERVING

BACKGROUND OF THE INVENTION

1. Field of the Invention

This invention relates to a heated pizza or food delivery system including food catering. This system keeps pizzas or food to be warm once out of the oven by a heater placed either in a bag or stand alone with a cover while being continuously heated by power from a wall power outlet, a car socket, or a battery, without using external power adapters.

2. Discussion of Background Information

Traditionally, food is delivered in an insulated container. The purpose is to keep food hot and tasty and retain attributes such as crispiness, texture, etc. Thin crust and gourmet pizzas require steady temperature regulation for its entire period after it has come out of the oven. In order to minimize bacteria growth, the Food and Drug Administration recommends keeping food at a temperature of at least 140 F. Temperatures above 190 F are considered active cooking for many foods; temperature regulation between 140 F and 190 F therefore is the optimal temperature range for food delivery.

Heated food delivery systems were initiated by Harold D. Solomon in U.S. Pat. No. 4,816,646 with a quick disconnect between the heater and the power source. However, despite several inventions that come later with an attempt to address the same problem; these solutions have not yet met the practical aspects and reliability required by a heated delivery system. A true heated delivery system requires a totally integrated solution, where it has to be portable, light-weight, amply spacious for food storage, temperature regulated, and continuously heated delivery solution for all situations—in stores, vehicles, and even places without a ready available power outlet.

In order to address the issue of power cables breaking in their quick disconnect systems, C. Owens et al. U.S. Pat. No. 6,989,517, U.S. Pat. No. 6,861,628, U.S. Pat. No. 6,555,789, U.S. Pat. No. 6,433,313, U.S. Pat. No. 6,392,201, U.S. Pat. No. 6,384,387, U.S. Pat. No. 6,121,578, and Brian L. Clothier et al., U.S. Pat. No. 6,504,135, U.S. Pat. No. 6,444,961, U.S. Pat. No. 6,232,585, replace the cable attachment to an external power source with an inductive heating solution. It can come in a form of conductive coils connected to a resistive heating element or passive induction plates that is heated by the magnetic induction charging station. However, in a typical delivery, it is common to find several orders packed in the same delivery bag. Each time the bag is opened for a delivery, the temperature inside the bag falls quickly; as you travel further delivery distances without a continuous power source to power the heater in the vehicle, the temperature cannot be maintained. In order to pack more energy stored in these induction plates, many of these heated plates reach temperatures above 200 F and as high as 240 F, exceeding the boiling point of water. Temperatures above 190 F are considered cooking the pizza. Such temperatures far exceed the recommended temperature for keeping pizzas, buffets, and other food warm and can change the food properties.

In a typical catering event where the food is left on display for a few hours, the inductive heating solution is inadequate. Inductive heater plates need to be profiled every six months because they do not maintain the same temperature profile after repeated use. Many have failed miserably when the peak temperature rises uncontrollably, burning holes in the insulated bags they are stored in.

William M. Bostic et al., U.S. Pat. No. 6,486,443, U.S. Pat. No. 6,060,696, U.S. Pat. No. 5,880,435, Sigurd Frohlich, U.S. Pat. No. 5,884,006 and Wayne Baldwin et al., U.S. Pat. No. 6,936,791 use phase change technology to release stored heat, but this also runs into the same problem as the induction heating, since the stored energy is quickly depleted after an extended period of use.

The challenge of continuously using an external electrical power source for heating up the heater lies in finding a good and reliable quick disconnect solution in addition to a lightweight, uniformly heating, thin, and large area heater requirement. However, typical power cables used for such devices have joints and connectors that are subject to repeated stress from repeated connection and disconnection of the cables. In heating environments, the heat communicates to the power cords, which are typically made of plastic, making them particularly vulnerable to damage from this induced stress. These cables thus often break under such stress, which discourages store owners from using these heaters.

This problem is compounded when the heater is designed for the 12V DC vehicle outlet. When the heater is in the store, where the wall outlet of 110V is used, a power adapter is required to convert 110V AC to 12V DC. Robert Check, U.S. Pat. No. 6,018,143 describes the use of a low voltage transformer in a restaurant. A power adapter adds further weight to the system, making the cord system even more complicated and fragile.

William Lee Duke et al. U.S. Pat. No. 6,222,987, even mentions that the connector has to be for a greater amperage outlet, since he includes a fan too.

This receptacle and power adapter problem is compounded when twenty or thirty bags are all powered at the same time. The typical solution involves a big transformer with several outlets, with one outlet for each bag. The use of a Power Distribution Unit or special power rack becomes a necessity. This extra equipment is a burden for a small store where space is a premium. The bags' heavy electrical power draw also requires a special high power electrical installation for each store. This implies that the use of the heated bags solution be fixed at the location of the store where the high power wall outlet is available and makes the store's renovation a nightmare, due to these constraints.

Arkady Kochman et al. U.S. Pat. No. 6,452,138, U.S. Pat. No. 6,403,935, U.S. Pat. No. 6,369,369, U.S. Pat. No. 6,229,123 describes the use of conductive textiles and threads as heating elements. Conductive threads do not heat large areas uniformly because the diameter of the threads is very small. The large diameter PTC heated fibers/wires found in heated blankets can be used as heating elements. They are usually very stiff with grid patterns, with a large space between fibers/wires, therefore creating a very uneven heat distribution. In total, these technologies do not address the qualities provided by a large area heater with a uniform heating profile.

SUMMARY OF THE INVENTION

The present invention involves a temperature regulated heated Pizza/Food delivery system that ca provide a continuous warming solution for pizza and food from the store, to the car and to the customer, in a vehicle, including the ability to be battery-powered, should an electrical outlet not be available. This invention can use a dual powered technology to power the heater directly from 110/220V AC wall outlets or 12V DC automotive outlets without needing power adapters. The heater's power plug can be a magnetic breakaway connector, accessible through an opening in the insulated bag. Two colored LED indicators can be used to indicate the source of power. A set of detachable feet that fit into the keyhole slot of the heater can allow it to stand independently. The Nonstick, water-resistant heater surface can allow it to serve heated food directly, replacing the ubiquitous fire hazard, Sterno.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings.

FIG. 1 shows a Dual Power Heater Assembly from the Top with feet snapped in;

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
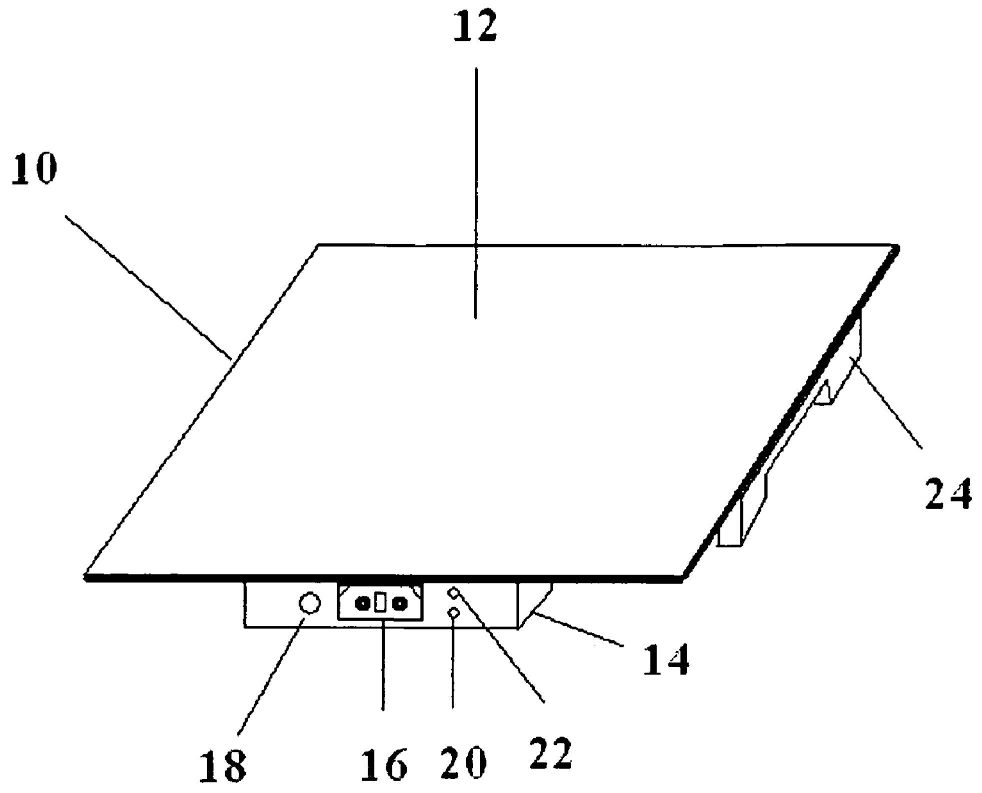
Figure 2:
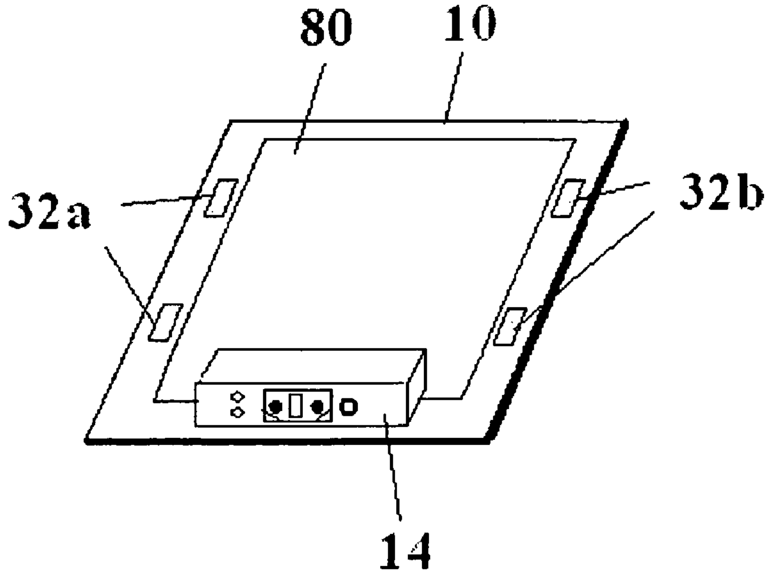
FIG. 2 shows a Dual Power Heater Assembly from the Bottom without snapped in feet.
Figure 3:
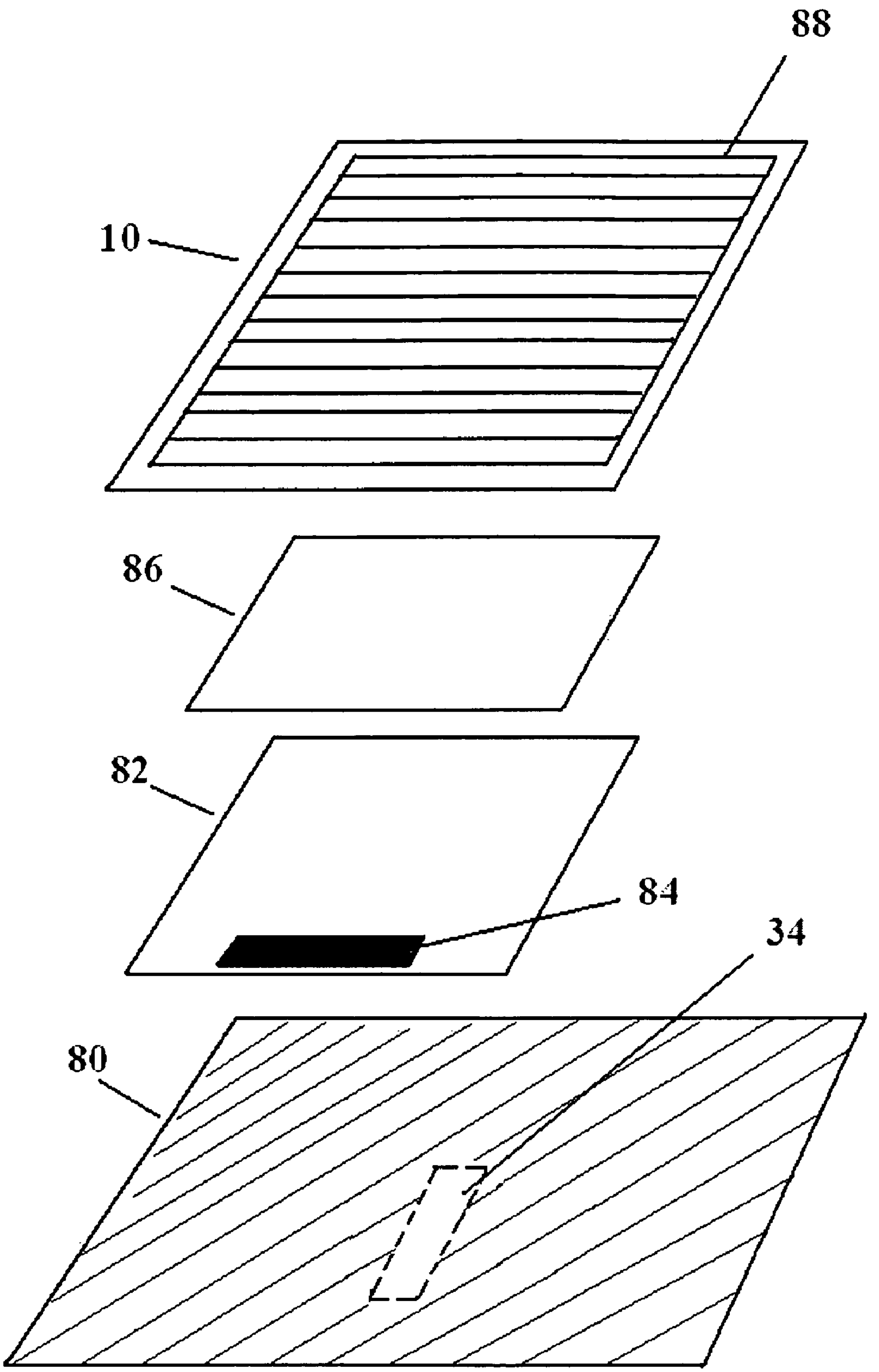
FIG. 3 shows a Dual Power heater assembly with PTF heater.
Figure 4:
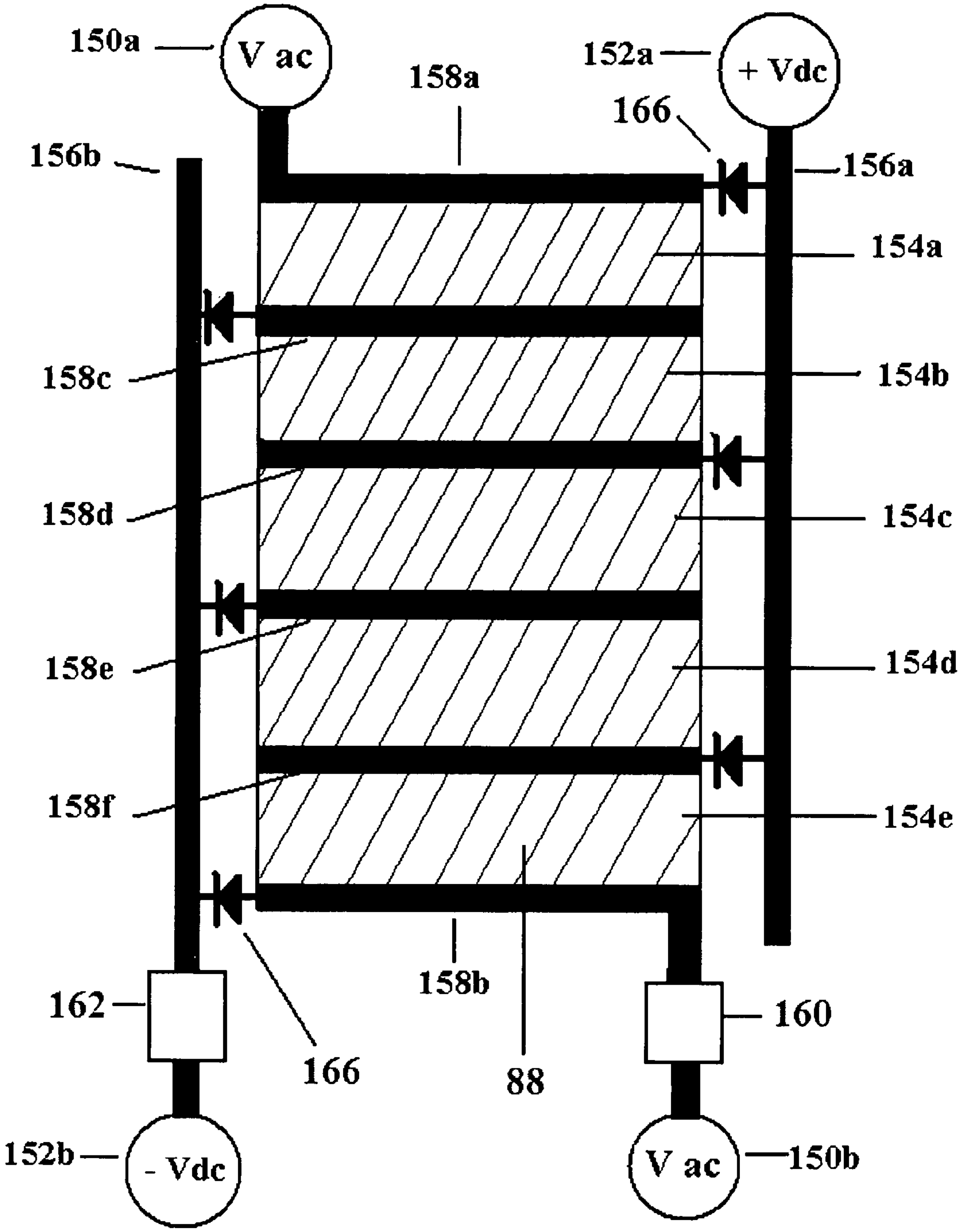
FIG. 4 shows a Large area uniform PTF heater design with 6 diodes and 2 thermostats.
Figure 5:
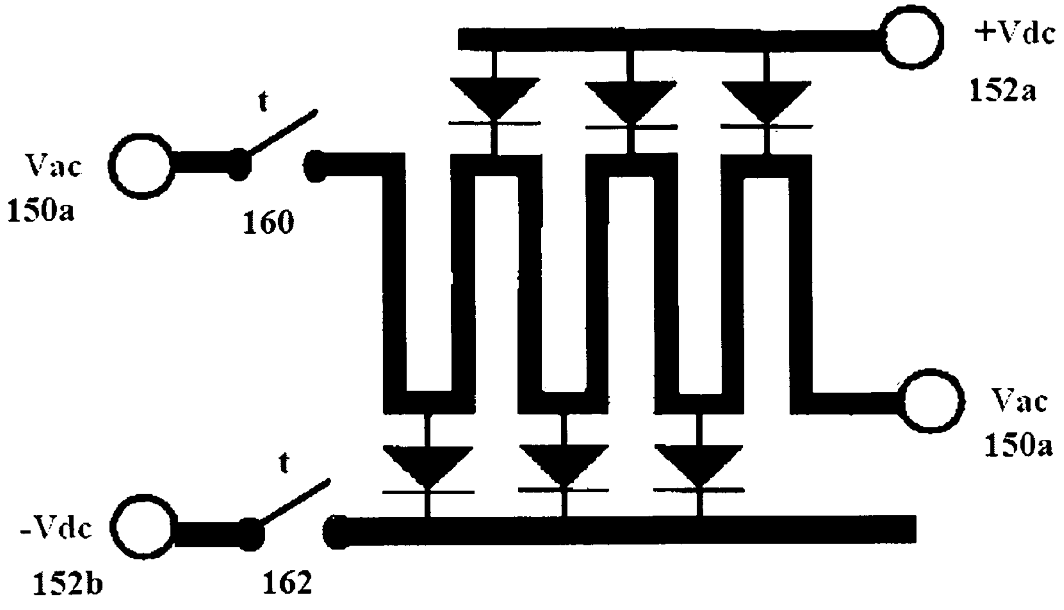
FIG. 5 shows an Electrical diagram of the Dual Power Heater with 6 diodes and 2 thermostats.

The heated delivery system is designed with environmentally friendly green technology that is comprised of five parts:

The dual power heater assembly—A heat source is provided that preferably accepts external AC wall power, DC car power, and/or battery power connections without the use of power adapters, power inverters, power converters, etc. It preferably has a smooth, water repellent surface that allows it to be easily wiped clean, should there be a food spill. Such a surface could, by way of non-limiting example, be a Teflon-coated plate or a Teflon-coated, fiberglass-wrapped plate. FIG. 1 shows the top of the heater assembly and FIG. 2 shows the bottom of the heater assembly. FIG. 3 shows the assembly with the PTF (Polymer Thick Film) heater unit. FIG. 4 shows the practical implementation of the PTF heater design with 6 diodes and 2 thermostats. The FIG. 5 shows the electrical representation of the Dual Power Heater with six diodes and 2 thermostats.

The view of FIG. 1 shows the assembled heating unit 10 as removed from its insulative casing. As shown the unit 10 includes a heating plate 12, power interface 14, a magnetic power connector 16, a DC connector 18, LED indicators 20 and 22 and supporting feet 24.

FIG. 3 shows the layers of material used to make an embodiment of the heating plate 12. a resistive film 88 is bonded in a configuration (discussed below) with appropriate electrical connections (discussed below) on a surface 10. Surface 10 is preferably a highly thermally conductive material such as metal, preferably aluminum. An electrical insulative layer 86 is underneath the resistive film 88 and associated electronics to provide electrical insulation; the material is able to withstand the heat generated by the resistive film 88, and is preferably also a thermal insulator. A PET or DYLARK plastic material are non-limiting examples of appropriate material. A thermal insulating layer 82 is below layer 84, and is preferably made of the same material as layer 86, although preferably thicker. Layer 82 has an opening 84 to allow for electronic component attachment. Layer 86 may similarly have such an opening, but it preferably smaller than layer 82 such that no opening is required. The lowermost layer 80 is preferably a non-stick material that can withstand the applied temperatures, such as TEFLON based fabric. Layer 80 is preferably large enough to wrap and enclose the entire heating plate 12, but in the alternative may be made of two or more sections (of the same or different material) that are connected together. The entire assembly is preferably thin (preferably on the order of 1/16 of an inch), lightweight (preferably on the order of 1-2 lbs).

As an alternative to the above, various layers may be combined and or provided in duplicate without deviating from the scope of the invention.

An advantage to the use of this layer methodology is that the top of heating plate 12 will reach the desired temperature, while the bottom remains substantially cooler due to the thermal insulation of the intervening layer(s). This allows for easier user manipulation, in that the user can carry the plate from the bottom without fear of burns or need for special handling materials (e.g., insulated gloves).

FIG. 2 shows a bottom view of the unit 10 without the layer 80. Areas 32*a* 32*b* illustrate connection points for the feet 24 as shown in FIG. 1.

Referring now to FIG. 4, an embodiment of the electrical layout of the heating elements of a heating plate 12 is shown. The resistive film of FIG. 3 is covered at roughly equidistant locations by conductive pathways 158*a*-158*f*, which separates the surface of film 88 into sub areas 154*a*-154*e*. The specific number of conductive pathways and resulting sub areas are exemplary only, and the invention is not limited thereto. An Ac power pathway is provided by AC power connections 150*a* and 150*b* to conductive pathways 158*a* and 158*b* at the outer edges of opposing sides of film 88. A DC power pathway is provided by DC power connections 152*a* and 152*b* to conductive pathways 156*a* and 156*b* at the outer edges of remaining opposing sides of film 88. A series of diodes 166 alternatively connect from the positive DC power supply of 152*a* and the negative DC power supply of 152*b*.

For uniform operation, it is desirable for the power applied to the resistive film 88 to be substantially identical regardless of whether the power applied is AC or DC; this maintains a uniform heating characteristic of the heating plate 12 regardless of the power source. When AC power is supplied to the film 88, the entire resistance of the film is applied thereto, and thereby establishes its heating parameters for AC. Similarly applying DC across the entire film 88 would, however, have a much lower current, with corresponding lower applied power and a different heating characteristic for the DC supply. In the embodiment of FIG. 4, when DC power is supplied to the film, the diodes forward bias to allow current to only have to pass through the individual subsections 154*a*-154*e*. As each of these subsections is smaller than film 88, the resistance is lower and the resulting current through each subsection is higher than film 88 as a whole. This provides the same power at higher current flow through film 88, which in turns reduces the requirement of applied voltage. Thus allows the power supplied through film 88 at AC to be substantially equal to that at DC, thus providing substantially uniform heating characteristics regardless of whether the power supply is AC or DC.

FIG. 5 shows the electrical layout of the physical elements as set forth in FIG. 4.

Heating plate 12 is preferably provided with a thermal regulation control methodology to maintain the desired temperature or range of temperatures. One example shown in FIG. 4 is to use two thermostats, each located in series with the AC and DC pathways respectively. In FIG. 4, and an AC powered thermostat 160 is connected in series between AC power supply 150*b* and 158*b*, and a DC powered thermostat 162 is connected in series between DC power supply 152*b* and 156*b*. The use of two thermostats allows for different temperature settings if required for AC and DC power in.

In the alternative, a microcontroller(s) with built in thermal sensor(s) controlling a power circuit switch supplying power to the heater. A non-limiting example would be a Texas Instruments, MSP430F2012 controller. Other methods, or combinations of the disclosed methods alone or with other methods could be used. The sensors need to be close enough to monitor the temperature, but otherwise flexibility is provided as to their location within the skill of the art.

The dual power heating element may utilize the power system of U.S. Pat. No. 6,847,018 to the present Applicant, the disclosure of which is incorporated herein by reference in its entirety.

Figure 7:
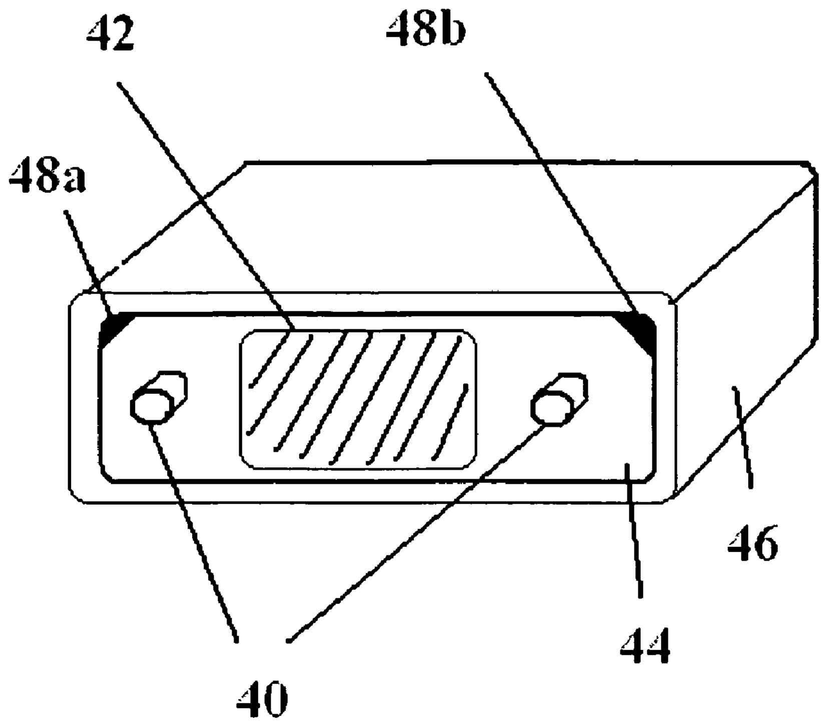
FIG. 7 shows a Breakaway Magnetic Socket.
Figure 8:
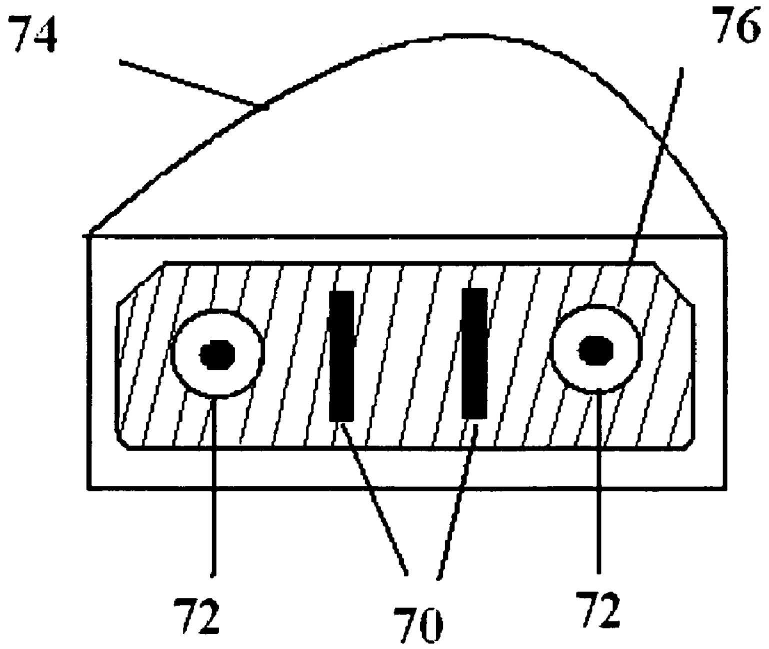
FIG. 8 shows a Breakaway Magnetic Plug.

The power connector system—Referring now to FIGS. 7 and 8, heating plate 12 preferably has types of power connectors to handle AC and DC supplies. To supply the AC power connector 16 that typically handles 110V AC or 220V AC from the wall outlets and the second kind is 12V DC power connector, 18, that draws power from a car's cigarette lighter outlet or battery pack. These connectors are located in the power interface 14, as shown in FIGS. 1 and 2. These power connectors are preferably easy to connect and still handle the power demand from the heating element. Easy connection also implies that power can be easily disconnected and reconnected at the cable end. Preferably it allows connection and disconnection from the power source without straining or breaking the power cable.

These two power connectors are preferably located at the front of the molded housing, located at the front of the heating plate 12. The AC connector 16 is preferably a magnetic breakaway connector. The DC connector 18 may also be a magnetic breakaway connector, but is preferably a simple DC power-jack as shown in FIG. 1. The DC power jack has a center conductor and the second conductor is its side cylindrical wall. FIG. 7 shows a detailed magnetic breakaway connector 40 and FIG. 8 shows a matching mating magnetic plug 70 on the cable end. Surfaces 42 and 70 establish the magnetic grapple, while connectors 44 and 72 form the AC power pathway.

Due to the structure of the plug, the AC connector 16 is preferably polarized, only permitting mating of the plug and socket in a one fashion.

This breakaway magnetic connector's 16 connection characteristics are defined by the strength of the magnetic force holding the plug and socket together. If a user accidentally knocks or pulls at a plug and separates the plug from the socket by a certain threshold, the magnet cannot maintain its attractive force and thus fails to maintain the binding. As a result, the plug and socket are completely disconnected. This breakaway connector provides a safe and efficient way to disconnect the plug from the socket. As a result, the cable can remain plugged into the AC outlet while the plug is disconnected from the socket, facilitating both disconnection and reconnection during rush hour for pizza delivery.

Furthermore, the ferromagnetic plate in the socket is an electrical conductor; it therefore also serves as a ground plate for grounding the system. Because of this, the plug is a three prong plug, making this a grounded system. Furthermore, this allows a ground fault detection feature to the connector system, when necessary.

Heater Detachable feet—A set of detachable feet, 24, as shown in FIG. 1, for the heater allow it to stand alone on a table or flat surface, which can be used for serving slices of pizza/pies/food. This feature eliminates the use of dangerous and environmentally hazardous Sternos to warm food, which also are known fire risks. It can also replace bulky hot water baths found in buffet restaurants as food warmers. In addition, a detachable cover can rest on the heating plate to retain heat within its covered space in this mode.

Figure 9:
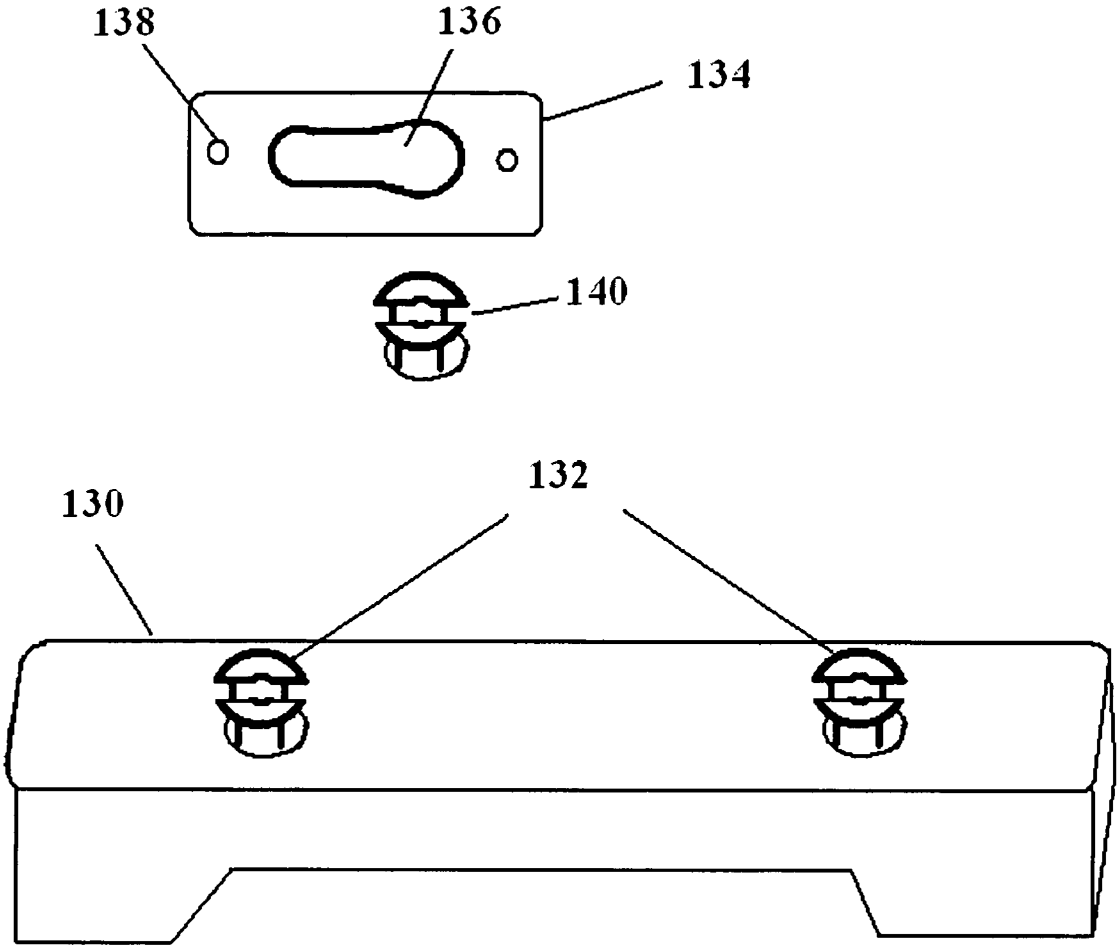
FIG. 9 shows Removable feet.

FIG. 9 shows one of the two detachable feet. The hollow, lightweight detachable feet, 130, have two raised circular split clips, 132, with a long narrow neck in its center. These two clips are inserted into two keyhole slots, found in the bottom of the heater plate bottom located near to the left and right edges of the plate, 24. The two slot positions on each side of the heater plate match the distance between the two clips of the feet. Each slot, 134, is designed with two adjacent, varying diameter holes on each side; the larger hole diameter allows the clip to go through and then slide horizontally towards the other smaller diameter hole same as the diameter of the neck of the clip, 140.

Figure 12:
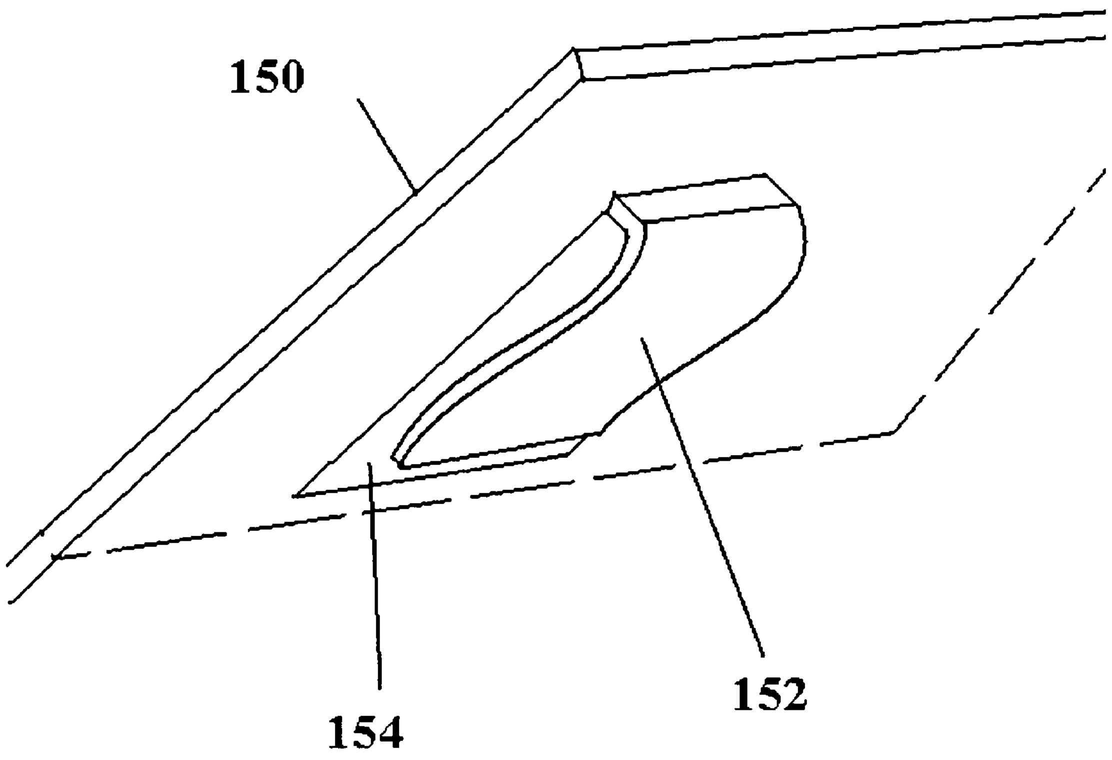
FIG. 12 shows an example of an alternate "S" Clip design for the feet.
Figure 13:
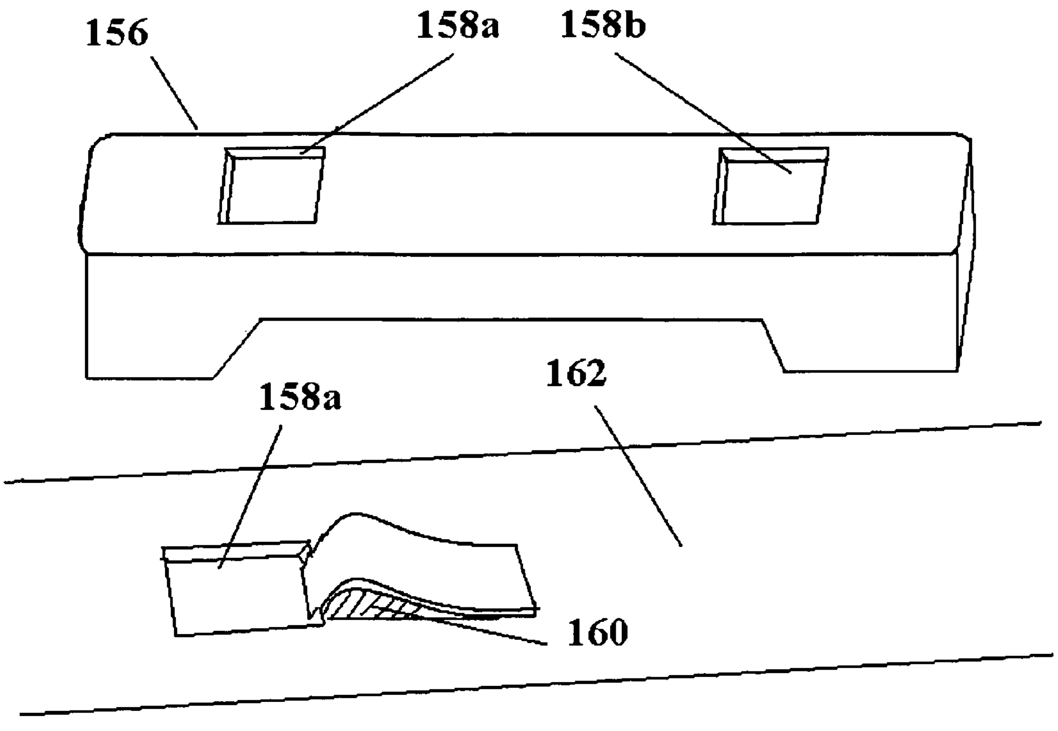
FIG. 13 shows the alternative removable feet using the "S" clip design.

An alternative detachable feet design is shown in FIG. 12 where the heater plate has an "S-Clip" design as shown as 152. This "S-clip" can be punched and formed out of the panel, 150. Then the corresponding hole on the panel is a rectangular slot as shown as 154. This mating feet design now uses also rectangular opening but now it is on the molded plastic side, 158*a* and 158*b* of FIG. 13. The clip is then inserted and clipped into this slot. It is locked in place by a bump structure, 160, on the back side of the molded feet, 162. This bump is hidden on the underside of the feet giving the feet a good appearance.

Figure 14:
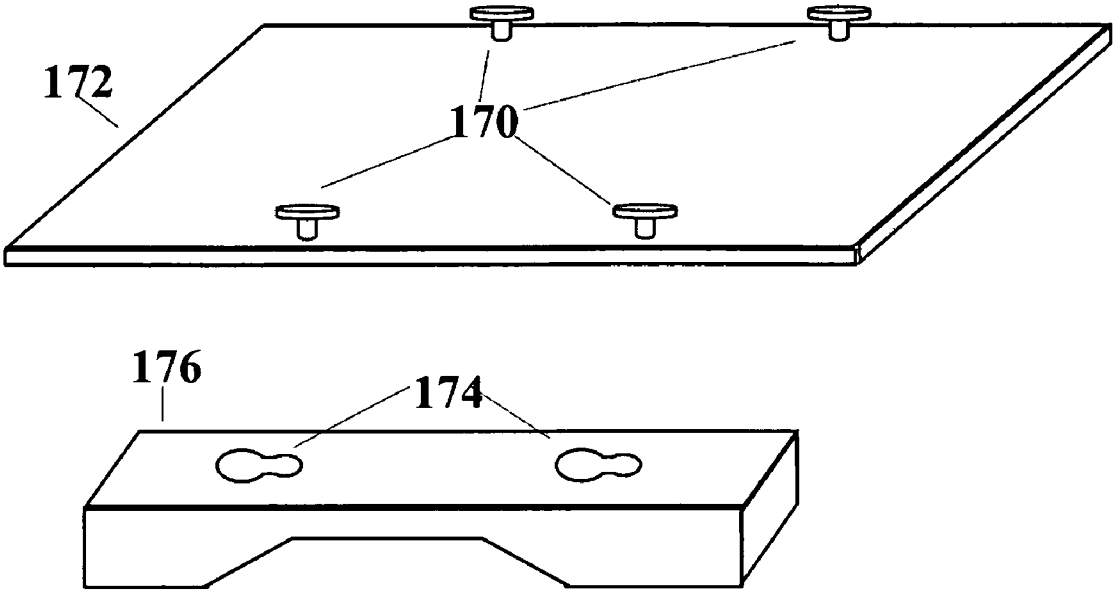
FIG. 14 shows an example of the Key-Hole on the removable feet design.

FIG. 14 shows another example of a detachable feet design 176 but having the keyhole slots 174 in the feet design. The detachable feet will latch onto the screwed on two keys 170 on the bottom side of the heater 170 near to its edge. The screwed on keys have the advantage of putting on these screws when this option is chosen.

Figure 6:
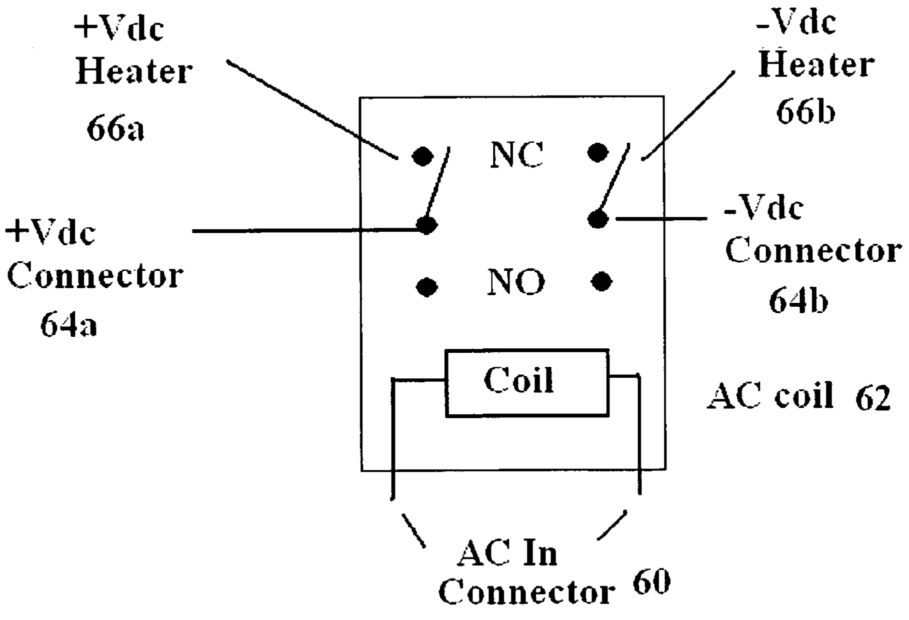
FIG. 6 shows a Double Pole Double throw relay electrical connection to Heater and Connector.

Safety feature: referring now to FIG. 6, the DC power jack can be electrically isolated from the AC connector by diverting the wipers (66*a*) and (66*b*) in a double pole, double throw relay into a nominally open state when AC power is applied to the AC coil (60). In the absence of the AC voltage across the relay coil (60) the relay wipers are in a nominally closed state (NC), and the DC power connector is connected to the DC connection of the heater (64*a*) and (64*b*). Thus, if one were to incorrectly connect both AC and DC sources, only one would be allowed to power the heating plate 12 (preferably the AC).

A rechargeable battery system—The rechargeable battery system allows the heater to be powered in the absence of a typical power source, such as wall outlets or car outlets. Furthermore, it allows itself to be recharged when the voltage is above a certain voltage without damaging its internal battery cells. It can be recharged by any DC or AC source. It can connect to power interface 14 via the DC jack 18. In the alternative, the battery could be part of the internal system itself and charged via power interface 14.

Figure 10:
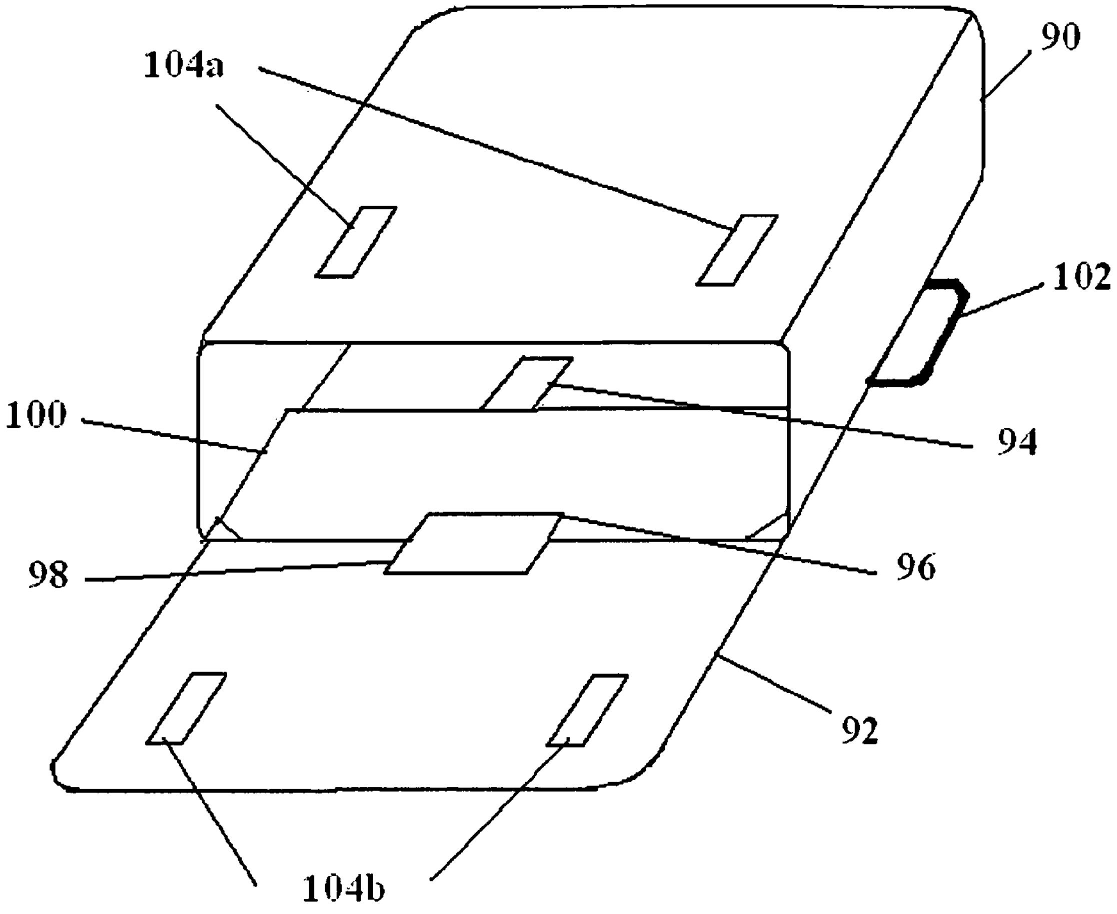
FIG. 10 show a Dual Power Bag.
Figure 11:
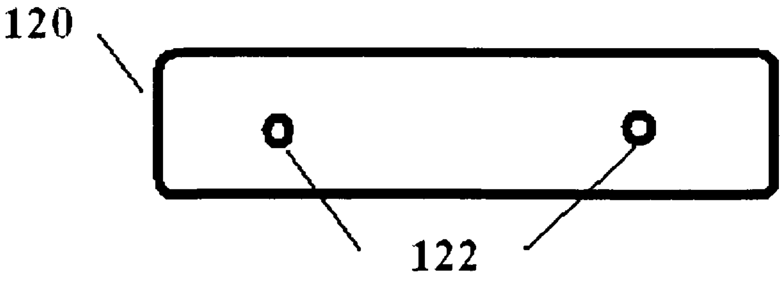
FIG. 11 shows Back air vents for the Dual Power Bag.

The insulated heater bag—FIGS. 10 and 11 shows the insulation when the dual power heater is inserted into the bag 90. Bag, 90 is designed to provide heat retention. Bag 90 itself is preferably made from the same material that is used for insulated pizza delivery industry, although as discussed below it has various unique features in its design.

To accommodate heating plate 12, the lower portion of bag 90 preferably has a fastener 34 to connect with the bottom of heating plate 12; a strip of Velcro is appropriate for this purpose with a matching strip on the bottom of heating plate 12. Heating element 12 can be laid on the bottom of bag 12, and is preferably held in place by a flap 100. Flap 100 is distinct from a cover flap 92 of the bag 90 itself, such that heating element 12 will remain in place when the cover flap 92 is opened to remove food contents. The large bag opening, 106, allows the pizza boxes and/or food to be placed on top of the heating plate 12. At least a portion of the front cover of the flap 90 is preferably made of a clear material such as soft vinyl, allowing the contents in the bag 90 to be seen clearly. Additional Velcro strips, 104*b*, are sewn onto the flap 92 to secure it to the Velcro strips, 104*a*, sewn onto the bag. Two air vents, 122, in the rear of the bag, 120, allow excessive moisture to vent from bag 90.

Flap 100 and flap 92 preferably have rectangular openings 96 and 98, respectively, to allow for external access to the connectors and indicators of power heating plate 12.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

Non-limiting examples are as follows.

A large area of thousandth inch Polymer Thick Film (PTF) heating element is bonded to one side of an electrically insulated but thermally conductive thin metallic plate to form the basis of this heating plate. This plate can either be square or rectangular, depending on the size needed for the food. Other shapes could also be used. The PTF heater can either be directly printed on the thin metallic plate, if anodized, or on an insulating substrate film, such as PET/PEN/PI films (Polyethylene Terephthalate or Mylar®/Polyethylene Naphthalate or Kaladex®/Polyimide or Ultem® or Upilex® adhered the substrate onto the metallic plate with a high temperature adhesive film, a method that permits unanodized and unpassivated metal to serve as the heating plate.

On the side opposite the heating element, the plate preferably has a smooth, water-repellant surface, such as Teflon (PTFE) or Teflon-coated fabric, to facilitate cleaning and prevent staining. A typically sized heating surface would be 15 inches×15 inches, a size that fits well for 12", 14", and 16" pizza boxes.

The plate temperature preferably undergoes thermal regulation by thermostats or other temperature-regulation devices, such as microcontroller systems with attached thermal sensors controlling power flow to the heating element with silicon controlled rectifiers (SCRs) or thyristors or relays. Two plate temperature regulators can permit the heater to be regulated at two different temperatures, perhaps with a dedicated temperature—and accompanying temperature regulator—for each power source, as indicated in U.S. Pat. No. 6,847,018.

Although the power connections are disclosed in the embodiments herein at the front of the bag 90, the invention is not so limited. It can be placed anywhere on heating element and/or relative to the exterior of bag 90 as may be appropriate. By way of example, it could be placed in the rear of the bad, which might allow for the bag 90 to be inserted into a rack with shelves and individual power connections for different bags.

What is claimed is:

1. A heated food system comprising:

a resistive film disposed between terminals of an AC power supply and terminals of a DC power supply, current from the terminals of the AC power supply going across the entire resistive film, and current from the terminals of the DC power supply being dispersed into subsections of the entire resistive film, the subsections collectively being smaller in area than the entire resistive film, such that the power consumed by the resistive film is substantially equal regardless of whether AC or DC power is applied;

a thermal conductor disposed above the resistive film, configured to receive and distribute heat generated by the resistive film when current flows though the film;

a thermal insulator disposed beneath the resistive film, to thereby limit heat transfer from the resistive film to areas below the resistive film;

a non-stick enclosure at least partially enclosing the resistive film, the thermal conductor, and the thermal insulator; and a DC power connector and an AC power connector connected to the terminals of the DC power supply and the terminals of the AC power supply, respectively.

2. The heated food system of claim 1, wherein the AC power connector is a magnetically coupled connector.

3. The heated food system of claim 1, wherein the resistive film is a polymer thick film.

4. The heated food system of claim 1, further comprising at least first and second sensors configured to monitor a temperature of the resistive film or the thermal conductor.

5. The heated food system of claim 1, further comprising two indicators showing whether AC or DC is providing power to the resistive film.

6. The heated food system of claim 1, further comprising slots in the non-stick enclosure configured to allowing feet to be attached.

7. The heated food system of claim 1, further comprising an insulated bag enclosing the non-stick enclosure and configured to support containers above the non-stick enclosure.

8. The heated food system of claim 7, wherein the bag has a flap with an at least partially transparent section to allow viewing of the contents of the bag.

9. The heated food system of claim 6, wherein the flap cover has an opening exposing power connectors for the resistive film.

10. The heated food system of claim 1, further comprising a safety relay to disconnect the direct current power receptacle from the heater assembly when alternating current is applied.

* * * * *